July 3, 1928.
S. E. MUELLER ET AL
1,675,374
PORTABLE MILLING MACHINE
Filed June 14, 1926
3 Sheets-Sheet 2
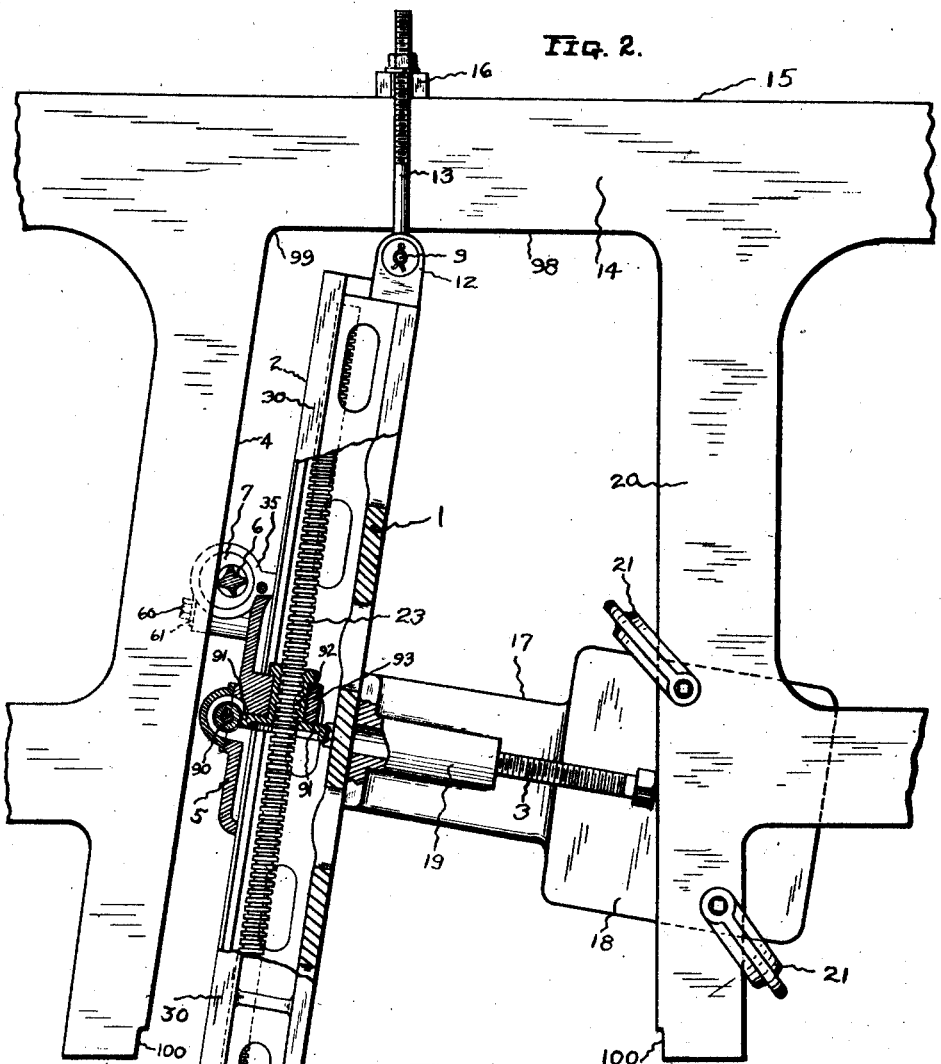
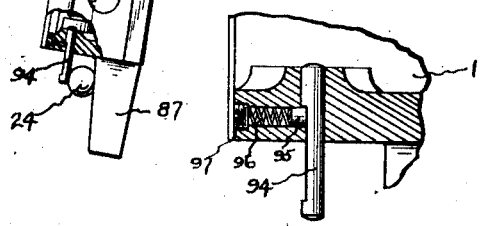
Inventor
Stephen E. Mueller
Guy M. Rodgers
By Evans and McCoy
Attorneys

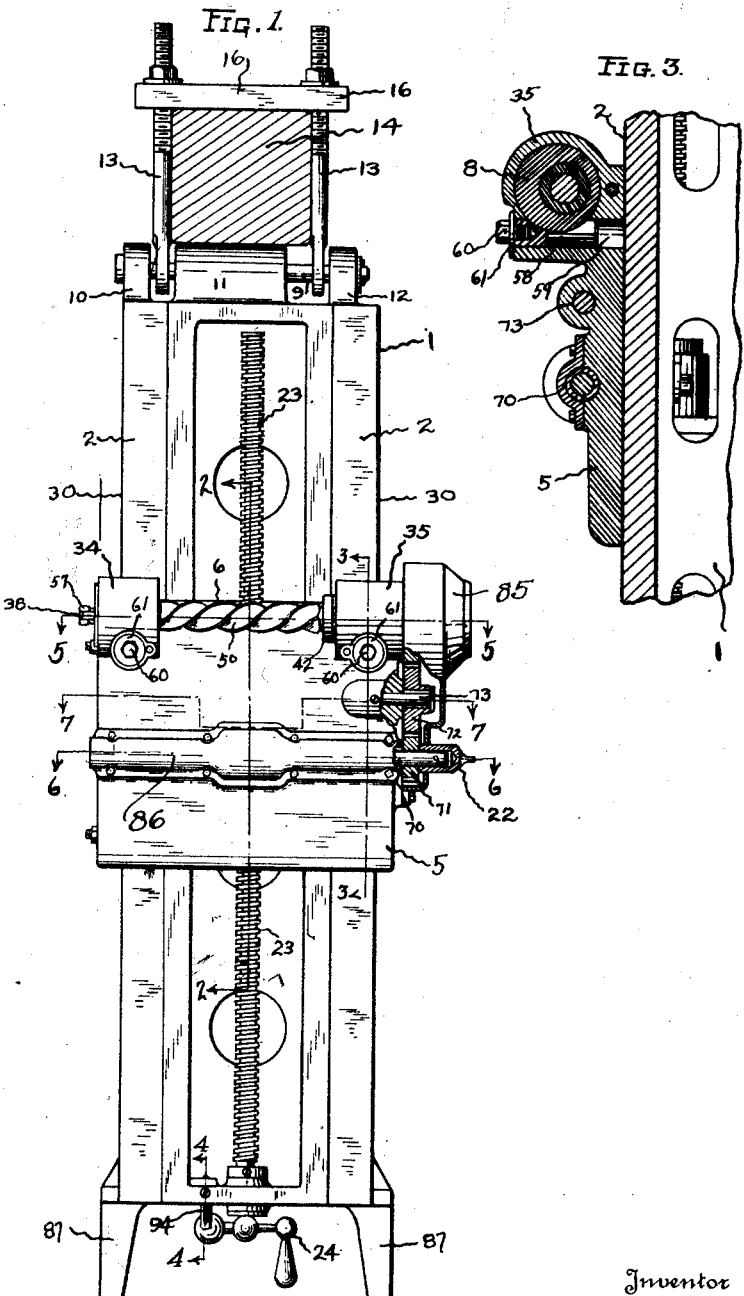

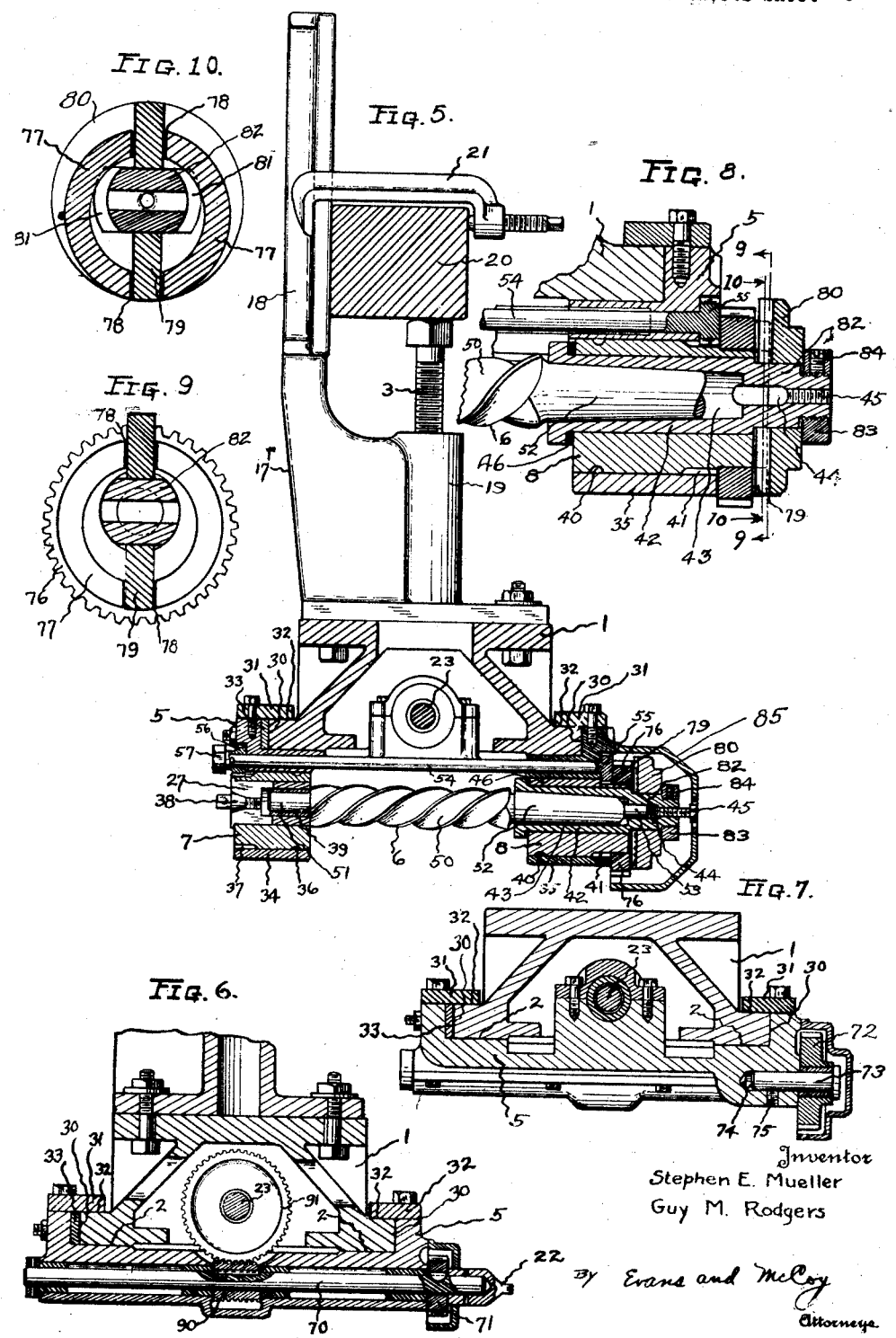

Patented July 3, 1928.

1,675,374

UNITED STATES PATENT OFFICE.

STEPHEN E. MUELLER AND GUY M. RODGERS, OF MOLINE, ILLINOIS.

PORTABLE MILLING MACHINE.

Application filed June 14, 1926. Serial No. 115,796.

This invention relates to machine tools, and more particularly to a portable milling machine adapted for machining portions of railway truck side frames and the like.

An object of this invention is to provide a portable milling machine particularly adapted to machine vertical or inclined surfaces.

Another object of our invention is to provide a portable milling machine wherein a rotary spiral cutter may be employed, said cutter being adapted to remove large amounts of stock in one cutting operation with a minimum requirement of power.

A further object of this invention is to provide a portable milling machine for machining the substantially vertical legs of a locomotive frame, said machine being adapted to mill a radius at the junction of such leg and a horizontal member of said frame.

Another object of our invention is to provide a suitable feeding mechanism for a portable milling machine, whereby the tool carriage may be raised by power and may be quickly lowered by hand.

A further object of this invention is to provide for a portable milling machine a suitable mounting for a milling cutter, whereby said cutter may be readily adjusted for a desired depth of cut without moving the bed of the machine, and while the machine is in operation.

Another object of our invention is to provide for a portable milling machine having a milling cutter adjustable for any desired depth of cut, means for transmitting power to said cutter regardless of the adjusted position thereof.

A further object of the invention is to provide for a pivotally mounted portable milling machine, means for readily disposing said machine in desired position, and for rigidly maintaining said machine in desired position.

Another object of this invention is to provide means for transmitting power to the moving carriage of a portable milling machine from a stationary source of power supply.

Other objects of the invention will be apparent to those skilled in the art from the description of it hereinafter given.

In the drawings,

Figure 1 is a front elevational view of a portable milling machine contemplated by our invention;

Fig. 2 is a side elevation, partly in section, on line 2—2 of Fig. 1, showing our improved portable milling machine disposed in cooperative relation with the inclined surface of a locomotive frame leg;

Fig. 3 is a vertical section on line 3—3 of Fig. 1;

Fig. 4 is an enlarged vertical section of the lock pin for the elevating screw, taken on line 4—4 of Fig. 1;

Fig. 5 is a horizontal section on line 5—5 of Fig. 1;

Fig. 6 is a horizontal section on line 6—6 of Fig. 1;

Fig. 7 is a horizontal section on line 7—7 of Fig. 1;

Fig. 8 is an enlarged view of the milling tool driving socket and associated parts shown in Fig. 5;

Fig. 9 is a vertical section on line 9—9 of Fig. 8; and

Fig. 10 is a vertical section on line 10—10 of Fig. 8.

The portable milling machine contemplated by this invention is shown as comprising generally a bed 1 pivotally mounted so that the surfaces 2 of the bed may be disposed, as by the jack screw 3, in parallel relation to a surface to be machined. On the bed 1 and slidable on the surfaces 2 is mounted a tool carriage 5 which, in turn, carries the machine tool, such as the spiral rotatable milling cutter 6. The milling tool 6 is preferably mounted in eccentric feed bearings 7 and 8, which will be later more fully described, whereby the relation of the tool 6 to the surface 4, and thus the depth of cut, may be readily adjusted without necessitating further adjustment of the entire bed 1 by the jack screw 3.

The bed 1 is shown as pivotally mounted adjacent its upper end. Thus (Figs. 1 and 2) a hinge pin 9 is shown as passing through the apertured bosses 10, 11, and 12 of the bed 1. Cooperating with the hinge pin 9, between the bosses 10 and 11, and 11 and 12, respectively, are the threaded eye bolts 13, which are adapted to extend upwardly of the horizontal member 14 of a locomotive frame 15. The clamp bar 16 is adapted to extend over the top of the horizontal member 14 and to be secured in place by suitable nuts on the threaded eye bolts 13. The bosses 11 and 12 are shown as relatively widely spaced apart, whereby the eye bolts 13 may relatively snugly engage the vertical sides of locomotive frames of various widths, whereby the milling machine may always be securely fastened. The position of the eye bolts 13 with respect to the surface 4 to be milled is so adjusted that when the surface 2 of the bed 1 is brought into parallelism with the surface 4, the milling cutter 6 may be brought into engagement with the surface 4 for the machining operation.

We have provided suitable means whereby the bed 1 of the machine may be adjusted to a desired pivotal position, such as with the surfaces 2 parallel with a surface 4, and whereby the machine may be rigidly maintained in said desired position. Thus, (Figs. 2 and 5) there is shown entending outwardly from the rear of the bed 1 a mounting bracket 17 provided with a flattened portion 18 and with a threaded apertured boss 19. To move the machine from a vertical position to the inclined position shown in Fig. 2, the bed 1 may be pivotally moved manually to the desired position and the jack screw 3 adjusted to cooperate with a side frame member 20 to maintain the bed 1 in desired inclined position. To maintain the bed 1 rigidly in position, clamps 21 may be employed to firmly engage the flattened portion 18 of the mounting bracket and the member 20 of a locomotive frame. It will be seen that before the clamps 21 are tightened, relatively fine adjustment may be made by turning the jack screw 3 to bring the surfaces 2 in exact parallelism with the surface to be machined, such as the surface 4.

The milling tool 6 is suitably mounted by means contemplated by this invention, whereby to make any desired depth of cut on the surface to be machined. The said cutter 6 is adapted to be rotated and simultaneously moved longitudinally of the surfaces 2 and of the surface 4 to be machined. The power for rotating the cutter is arranged to be transmitted to the cutter through the universal joint connection 22, through which joint the power for moving the cutter 6 and the carriage 5 longitudinally of the machine may also be transmitted. The cutter 6 and the carriage 5 may also be moved longitudinally of the milling machine by hand operated mechanism to be hereinafter described. Preferably, the cutter 6 is rotated and the carriage 5 moved upwardly of the milling machine by a suitable source of power, such as a motor connected as by a flexible or telescoping shaft to the universal joint 22. It may be explained that for the milling operation the carriage 5 and cutter 6 are preferably first disposed adjacent the lower end of the surface to be milled, the cutter moving upwardly of the milling machine during the milling operation. To quickly return the cutter to the lower end of the milling machine and of the surface to be milled, we prefer to employ hand operated mechanism, though it will be understood that power operated mechanism might be employed to accomplish this purpose. Thus, there is shown a vertical elevating screw 23, which is operated by turning the ball crank handle 24, whereby the carriage 5 may be moved to any desired part of the milling machine by hand. The means for mounting the milling cutter 6, for rotating the cutter and for moving the tool carriage 5 longitudinally of the milling machine bed will be described in greater detail in the following paragraphs.

The milling cutter 6 is mounted on a carriage 5, which is adapted to slidably cooperate with the top surfaces 2 and side surfaces 30 of the bed 1. Guide plates 31 are also provided, which cooperate with the surfaces 32 of the bed. A gib of usual construction is provided at 33. The carriage is provided with spaced apertured bosses 34 and 35 within which, through intermediate parts, is mounted a milling cutter 6.

Within the boss 34 (Figs. 2 and 5) is disposed an eccentrically apertured feed bearing 7, which is shown as provided with an annular oil groove 36, and gear teeth 37 for rotating the bearing 7, as will be later more fully described. Within the eccentrically disposed aperture of the bearing 7 is shown a false bushing 27, which is split at its outer end, said split portion being provided with a tapered lock screw 38, by means of which the false bushing 27 may be rigidly and nonrotatably secured within the bearing 7. Within the inner end of the false bushing 27 is a bushing 39, which cooperates with one end of the cutter 6.

Disposed within the apertured boss 35 is the eccentrically apertured feed bearing 8, which is provided with an annular oil groove 40 and gear teeth 41. Within the eccentrically disposed aperture of the bearing 8 is mounted the driving socket 42, which is shouldered adjacent the inner end of the bearing 8, a washer 46 being shown disposed between said shouldered portion and the adjacent bearing portion. The driving socket 42 is provided at its inner end with a tapered aperture 43 to receive a correspondingly tapered portion of the cutter 6. Extending into the tapered aperture 43 is a narrow slot 44 which also extends transversely through the socket 42. Extending into the slot 44 is a threaded aperture adapted to receive the cap screw 45.

The milling cutter 6 is provided at its central portion 50 with spirally ground cutting edges. From one end of the cutting portion 50 extends outwardly the cylindrical portion 51 which is adapted to be rotatably supported within the bushing 39. Directly adjacent the opposed end of the cutting portion 50 is the portion 52, which is tapered to correspond with the taper of the portion 42, whereby a driving fit may be obtained between said portions 52 and 42. Extending outwardly of the portion 52 is the narrow portion 53, which is adapted to engage within the narrow slot 44. It will be seen that by means of the driving fit between the portions 52 and 42 and by the engagement of the portion 53 within the narrow slot 44, the cutter 6 is locked against rotative movement with respect to the driving socket 42. The cap screw 45 is adapted to engage the end portion 53 of the cutter to eject the cutter from engagement with the socket 42, as will be later more fully explained in connection with the operation of the milling machine.

Means is provided whereby the depth of cut to be made by the milling cutter 6 may be readily regulated by varying the eccentricity of the cutter 6 with respect to the bosses 34 and 35. Thus, referring particularly to Fig. 5, there is shown extending through apertures in the carriage 5 an eccentric feed shaft 54 provided at one end with a gear 55 adapted to cooperate with the gear portion 41 of the feed bearing 8. At the opposite end of the feed shaft 54 is mounted in locked relation to the shaft, as by a pin, the feed gear 56, which is adapted to cooperate with the gear portion 37 of the bearing 7 and which has at its outer end a nut portion 57, whereby the gears 55 and 56 can be simultaneously rotated, thereby changing the eccentricity of the cutter 6 with respect to the bosses 34 and 35 and adjusting for the depth of cut.

Means is provided to prevent the feed bearings 7 and 8 from further rotative movement after the cutter 6 has been adjusted to a desired position. Thus, (Fig. 3) a lock pin 58 is provided to engage each of the bearings 7 and 8, the pins being disposed in apertures 59. Each pin 58 has a radially cut away portion adapted to snugly engage the outer surface of the bearings 7 and 8, respectively. The outer end of each pin is provided with a threaded aperture adapted to engage with a nut 60 passing through a washer 61. By tightening each nut 60, it will be seen that the part of the radially cut away portion more remote from the nut 60 will be brought into very tight engagement with the adjacent portion of the surface of the bearings 7 and 8, thereby locking the bearings against rotative movement.

The milling cutter 6 may be rotated regardless of the degree of eccentricity thereof by new and novel driving connections of our invention disposed between the tool 6 and the universal connection 22. The said universal connection 22 is attached to the outer end of the drive shaft 70 (Fig. 6) journaled in suitable bearings transversely of the carriage 5. Intermediate the carriage 5 and the universal connection 22 is the drive gear 71 keyed on the shaft 70. The gear 71 drives the intermediary gear 72. The intermediary gear 72 (Fig. 7) is rotatably mounted on a shouldered shaft 73, which is journaled in the aperture 74 and locked against rotation in said aperture by suitable means such as the set screw 75. A suitable bushing is disposed between the gear 72 and the shaft 73. The intermediary gear 72 drives the driven gear 76, which is rotatably mounted on the feed bearing 8. The gear 76 is provided with an outwardly extending annular portion 77 provided with the aligned slots 78. The slots 78 engage with the projections 79 of the driving collar 80. The collar 80 is provided with a parallel-sided elongated slot 81, which slot slidably engages the correspondingly shaped reduced portion 82 of the driving socket 42, whereby the collar 80 is locked against rotation with respect to the driving socket 42. A lock nut 83 is shown as provided on the outer reduced threaded end of the driving socket 42, whereby the slots 78 of the driven gear 76 and projections 79 of the collar 80 may be maintained in cooperative relation. The lock nut 83 may be firmly held in position by any suitable means, such as the set screw 84. A suitable guard 85 is provided to enclose the tool rotating gears and associated parts.

It will be seen that the gears 71, 72 and 76 are always in mesh regardless of the eccentric position of the cutter. The gear 76 is furthermore always connected in driving relation with the collar 80 regardless of the eccentric position of said collar with respect to the gear 76 since the projections 79 of the collar 80 are free to move within the slots 78 of the gear 76, and the collar 80 may move laterally of the driving socket portion 82 by reason of the elongated slot 81. The milling cutter 6 may thus be rotated regardless of its eccentric adjustment, by power means attached to the universal joint 22, the power being transmitted from the joint 22 to the gear 71, to the gear 72, to the gear 76, to the collar 80, to the driving socket 42, to the milling cutter 6.

The cutter 6 may be moved longitudinally of the bed 1 simultaneously with the rotation of the cutter. Thus, referring particularly to Figs. 2 and 6, there is shown keyed on the shaft 70 a worm 90 disposed in cooperative relation with a worm wheel 91. The worm wheel 91 is shown as forming an integral part of the shouldered worm gear nut 92, which is journaled within the boss 93 of the carriage 5. The worm gear nut 92 is internally threaded to cooperate with the screw 23. Thus, the source of power supply attached to the universal joint 23 serves to move the cutter 6 longitudinally of the milling machine simultaneously with the rotation of said cutter. A guard 86 is shown to enclose the shaft 70 and associated parts.

When the cutter 6 is being moved vertically by power means attached to the connection 22, the screw 23 is locked against turning by a lock pin 94 engaging the ball crank handle 24. The lock pin 94 is journaled in an aperture disposed at the lower end of the bed 1 and is maintained in engaged or disengaged relation with the handle 24 by means of a plunger 95 (Fig. 4) engaging with the flattened portion of the pin 94. The plunger 95 is disposed in a transverse aperture in the bed 1 and is maintained under pressure against the pin 94 by a coiled spring 96, which is confined within the said aperture by a set screw 97.

To move the carriage 5 longitudinally of the bed 1 when the power operating means is disengaged from the connection 22, the pin 94 is moved upwardly out of engagement with the handle 24. The carriage 5 may then be quickly moved longitudinally of the milling machine by rotation of the handle 24. It will be noted that the carriage 5 may be moved vertically by rotation of the screw 23 by reason of the fact that during such rotation of the screw the worm gear nut 92 remains in non-rotative position due to locking engagement with the worm 90.

At the lower end of the bed 1 are shown legs 87 upon which the milling machine may be supported when not in use.

In operation, when it is desired to machine an inclined surface, such as an inclined surface of a locomotive frame, the milling machine may first be attached to the horizontal member 14 by means of the eye bolts 13 and clamp 16. The bed 1 of the machine may then be pivotally moved manually to a position where the bed surfaces 2 are substantially parallel with the surface to be milled without readjustment of the clamp 16 and associated parts. The bed 1 may be caused to remain in such inclined position by causing the jack screw to cooperate with a member 20 of the locomotive frame. When the bed 1 has been adjusted to its desired inclined position, as by suitable manipulation of the jack screw 3, said bed may be rigidly affixed in desired position by attaching the clamps 21 to the flattened portion 18 and locomotive frame member 20. The carriage 5 is then lowered, preferably by hand, to such a position that the milling cutter 6 is adjacent the lower portion of the surface 4 to be milled. The cutter 6 may then be adjusted by turning the nut 57 to give the desired depth of cut and the cutter may be rigidly maintained in such adjusted position by regulating the pins 58, as has been previously described. Power driving means is then connected to the universal connection 22, as from a compressed air or electric motor. The pin 94 is caused to engage the handle 24 and the power driving means, such as a motor (not shown) may be started. The cutter 6 is thus rotated and simultaneously moved upwardly of the surface to be milled, as by said motor. The cutter may be permitted to travel up the entire surface 4 to be milled until it reaches the adjacent horizontal surface 98. The cutter thus not only machines the entire surface 4 but also the curved angle portion 99 between the surface 4 and the surface 98. The speed of rotation and of longitudinal movement of the cutter are preferably so regulated that the surface 4 may be completely machined in one operation. It will moreover be noted that the offset portions 100 may be milled merely by adjustment of the eccentric feed bearings 7 and 8, without required any further adjustment whatever of the bed of the machine. Since the longitudinal movement of the carriage along the bed 1 by the power driven means is ordinarily geared for slow travel, it is frequently preferable to return the carriage 5 to the lower portion of the bed 1 by hand, by releasing the pin 94 from engagement with the handle 24 and rotating said handle by hand. Of course, the machine may be constructed with several speeds for motor driven operation, where desired, without departing from the scope of our invention.

It will be seen that even after the milling machine is connected adjacent its upper end to the member 14, the bed of the machine may be pivotally moved to any desired angular position, or such angular position varied, without readjustment of the clamp members 16 and associated parts.

It will also be seen that the vertical movement of the carriage 5, during the milling operation, is smooth and uniform, and not intermittent, whereby an exceptionally smooth machined surface is obtained.

It will be noted that our portable milling machine is adapted to mill surfaces of locomotive frames and the like without necessitating the complete disassembly of the locomotive frame and without removal of the assembly from the railroad tracks.

It will furthermore be seen that we have provided a portable milling machine of relatively light and simple construction and yet of great efficiency in operation.

It will also be seen that by means of a portable milling machine contemplated by our invention surfaces disposed at any angle to the vertical may readily be milled without disassambly of the construction of which such portion to be milled forms a part.

Furthermore, it is to be understood that the particular forms of apparatus shown and described are presented for purposes of explanation and illustration, and that various modifications of said apparatus can be made without departing from our invention as defined in the appended claims.

What we claim is:

1. In a portable milling machine, in combination, a bed, a carriage slidable longitudinally of the bed, a rotatable milling cutter having its axis parallel to the surface to be milled, adjustable mountings adjacent the ends of the cutter to receive said cutter whereby, by adjusting said mountings, said cutter may be adjusted independently of said carriage toward and away from the work to be milled, driving means to rotate said milling cutter on its own axis, said driving means comprising a pair of cooperative members to drive said milling cutter when adjusted for any desired depth of cut, said cooperative members being mounted on different axes, and means to permit relative bodily movement of one cooperative member with respect to the other.

2. In a portable milling machine, in combination, a bed adapted to be disposed parallel to the surface to be milled, a carriage movable longitudinally of the bed, a rotatable milling cutter having its axis parallel to the surface to be milled, said cutter being mounted in spaced, axially aligned, rotatably adjustable bearings carried by said carriage, the axis of said milling cutter being eccentric to the axis of said bearings, a member rotative with said milling cutter and having its axis of rotation in alignment with the axis of said cutter, a driven gear having its axis in alignment with the axis of said bearings, said rotative member and driven gear having cooperative surfaces, whereby power may be transmitted to said milling cutter through said driven gear independently of the eccentric position of said cutter.

3. In a portable milling machine, in combination, a bed adapted to be disposed parallel to the surface to be milled, a carriage movable longitudinally of the bed, a rotatable milling cutter having its axis parallel to the surface to be milled, said cutter being mounted in spaced, axially aligned, rotatably adjustable bearings carried by said carriage, the axis of said milling cutter being eccentric to the axis of said bearings, a gear mounted to rotate about the axis of said bearings, a collar having its axis in alignment with the cutter and being mounted to be driven by the gear while rotating about an axis eccentric to the axis of the gear, said collar being arranged in driving relation to said milling cutter.

4. In a portable milling machine, in combination, a bed adapted to be disposed parallel to the surface to be milled, a carriage movable longitudinally of the bed, a rotatable milling cutter having its axis parallel to the surface to be milled, said cutter being mounted in spaced, axially aligned, rotatably adjustable bearings carried by said carriage, the axis of said milling cutter being eccentric to the axis of said bearings, a gear mounted to rotate about the axis of said bearings, means axially aligned with the cutter to drive the cutter, said means being cooperatively associated with said gear whereby to rotate with said gear to drive said cutter.

5. In a portable milling machine for milling portions of locomotive side frames and the like, in combination, a slidable carriage, a rotatable milling cutter carried by said carriage and adjustable with respect to said carriage toward and away from a surface to be milled, the axis of rotation of said milling cutter being disposed parallel to said surface to be milled, adjustable cutter rotating means cooperatively associated with said milling cutter, said adjustable cutter rotating means being adapted to cooperate continuously with a power transmitting gear rotatable about a stationary axis whereby to transmit rotative motion to said milling cutter at any adjusted position of said milling cutter with respect to the surface to be milled.

6. In a portable milling machine, in combination, a bed, a carriage slidable longitudinally of said bed, means for adjusting a cutter relative to the carriage and to the surface to be milled comprising a pair of spaced axially aligned rotatably adjustable bearings carried by said carriage, the axis of said bearings being disposed transversely of and parallel to said bed, said bearings being provided with aligned apertures, the axis of said apertures being parallel and eccentric to the axis of said bearings, a milling cutter disposed between said bearings and supported at its ends within said apertures, a gear wheel disposed concentrically of one of said bearings, power transmitting means secured to an end of said milling cutter, said means being disposed in power receiving relation to said gear wheel at every position of rotative adjustment of said adjacent bearing, and means for rotating said gear wheel, thereby providing for the rotation of said milling cutter at any position of rotative adjustment of said bearing.

7. A portable milling machine for milling plane surfaces of a locomotive side frame and the like, comprising, in combination, means adapted to engage said side frame to support said machine, a machine bed pivotally suspended from said supporting means, means adapted to maintain said machine bed rigidly in a desired adjusted position, a carriage carried by said bed and movable longitudinally of said bed, a rotatable milling cutter carried by said carriage, the axis of said milling cutter being parallel to the surface to be milled and perpendicular to the direction of longitudinal movement of the carriage, means for adjusting said cutter relative to the carriage and to the surface to be milled, means arranged to transmit rotative movement to said cutter at any adjusted position thereof, power operated means to rotate said cutter and simultaneously move said carriage longitudinally of the machine bed, and manually operated means adapted to move said carriage longitudinally of said machine bed.

8. In a portable milling machine, in combination, a bed, a carriage slidable longitudinally of said bed, a pair of spaced aligned apertures in said carriage, the axis of said apertures being disposed parallel to the upper cooperative surface of said bed and transversely of the direction of movement of said carriage, a pair of simultaneously rotatable bearings disposed within said carriage apertures, aligned apertures within said bearings, the axis of said bearing apertures being eccentric and parallel to the axis of said bearings, a driving socket rotatably mounted within one of said bearing apertures, a milling tool mounted with its cutting portion intermediate said bearings, the ends of said milling tool being disposed respectively within said bearing apertures, one of said ends being locked against rotation with said driving socket, a gear wheel mounted concentrically of the bearing carrying said driving socket, a collar carried by said driving socket and locked against rotation therewith, said collar and gear wheel having mutually engageable surfaces, whereby said collar and gear wheel are disposed in driving relation at all rotative positions of said bearing, and means for driving said gear wheel.

9. In a portable milling machine, in combination, a bed, a carriage slidable longitudinally of said bed, spaced axially aligned bearings carried by said carriage, the axis of said bearings being disposed parallel to the upper sliding surfaces of said bed and transversely of the direction of longitudinal movement of said carriage, said bearings being provided with axially aligned eccentrically disposed apertures, a milling tool rotatably supported in said bearing apertures, means for simultaneously rotatably adjusting said bearings, whereby to vary the distance of the axis of said milling tool with respect to said work, means for locking said bearings at a desired adjusted position, and means for rotating said milling tool in said desired adjusted position.

10. In a portable milling machine, in combination, a bed, a carriage slidable longitudinally of said bed, a rotatable milling cutter carried by said carriage, and means adapted to transmit power for rotating said milling tool and simultaneously moving said carriage longitudinally of said bed, said means comprising a screw disposed longitudinally of the bed and adapted to be locked against rotation, a nut carried by said carriage, said nut carrying a gear wheel and being disposed in cooperative relation on said screw, a shaft adapted to be rotated from a source of power supply, driving connections from said shaft, whereby to rotate said milling tool, and driving connections from said shaft to rotate said gear wheel, whereby to simultaneously move said carriage longitudinally of said bed.

11. In a portable milling machine for use with locomotive side frames and the like, in combination, a base, a carriage mounted on said base, means for supporting a milling tool with its axis parallel to said base including a bearing journaled in said carriage, the axis of said tool being disposed eccentrically of the axis of said bearing, said bearing being rotatably adjustable to vary the distance of said tool from the work to be milled, means for locking said bearing against rotation when said tool is in desired position, a gear wheel mounted concentrically of said bearing and exteriorly thereof, and a member disposed in locked relation with said tool engaging said gear wheel in driving relation at all positions of said tool, whereby power may be transmitted from said gear wheel to said tool for the rotation thereof at any position of said tool with respect to said base.

In testimony whereof we affix our signatures.

STEPHEN E. MUELLER.
GUY M. RODGERS.